United States Patent [19]
Guillotel et al.

[11] Patent Number: 5,768,534
[45] Date of Patent: Jun. 16, 1998

[54] METHOD AND DEVICE FOR COMPRESSING DIGITAL DATA

[75] Inventors: Philippe Guillotel, Vern sur Seiche; Didier Mainard, Acigne, both of France

[73] Assignee: Thomson Broadcast Systems, Cergy Pontoise Cedex, France

[21] Appl. No.: 775,189

[22] Filed: Dec. 30, 1996

[30] Foreign Application Priority Data

Dec. 29, 1995 [FR] France ............................ 95 15743

[51] Int. Cl.$^6$ .................................................... G06F 17/00
[52] U.S. Cl. ............................................. 395/200.77
[58] Field of Search ..................... 395/200.77; 364/715.02; 348/384, 419; 382/251, 252

[56] References Cited

U.S. PATENT DOCUMENTS

| | | | |
|---|---|---|---|
| 4,920,426 | 4/1990 | Hatori et al. | 348/420 |
| 5,335,016 | 8/1994 | Nakagawa | 348/405 |
| 5,412,429 | 5/1995 | Glover | 348/398 |
| 5,426,517 | 6/1995 | Schwartz | 348/405 |
| 5,463,702 | 10/1995 | Trueblood | 382/239 |
| 5,469,212 | 11/1995 | Lee | 348/420 |
| 5,574,503 | 11/1996 | May | 348/420 |

FOREIGN PATENT DOCUMENTS

| | | |
|---|---|---|
| 0 509 576 A2 | 10/1992 | European Pat. Off. . |
| 0 711 079 A2 | 5/1996 | European Pat. Off. . |

OTHER PUBLICATIONS

Error Accumulation of Repetitive Image Coding by Shih–Fu Chang & Alexandros Eleftheriadis May 30, 1994, pp. 201–204.

*Primary Examiner*—Ellis B. Ramirez
*Attorney, Agent, or Firm*—Oblon, Spivak, McClelland, Maier & Neustadt, P.C.

[57] ABSTRACT

A data compression device having a decorrelation circuit (10), a circuit (12) for quantizing the decorrelated data and a control circuit (13) acting on the quantization step. The device includes is a circuit for calculating a histogram of the decorrelated data and for calculating the quantization step on the basis of this histogram (11) in order to force, in accordance with the coherence of the histogram, this quantization step. The latter is calculated on the basis of the distances between the local maximum values of the histogram.

8 Claims, 4 Drawing Sheets

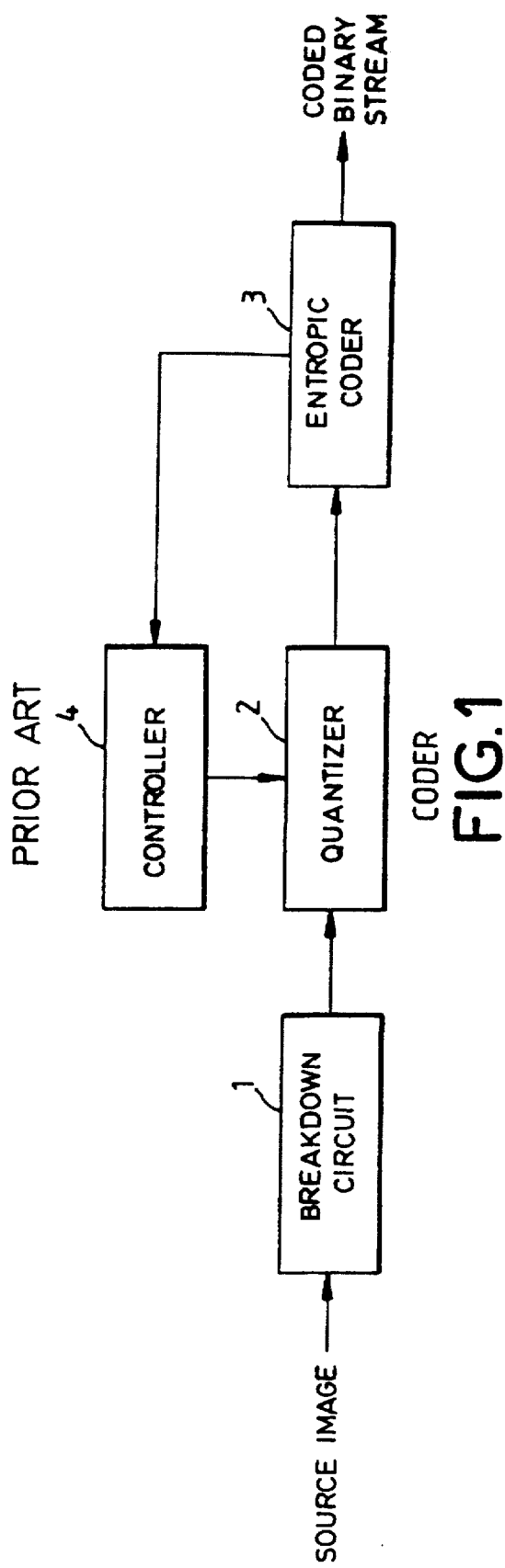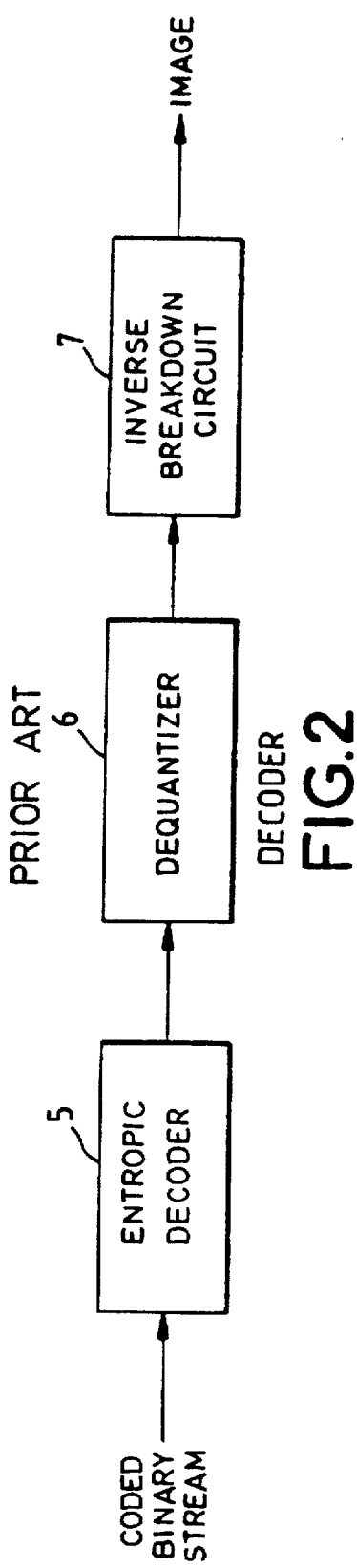

METHOD AND DEVICE FOR COMPRESSING DIGITAL DATA

BACKGROUND OF THE INVENTION

1. Field of the Invention

The present invention concerns a method and a device for compressing digital data. More particularly the present invention relates to a source coding of the non-reversible type, that is to say effecting a compression of the signal at the cost of a small loss of information, a coding based on a quantization of the signal.

2. Discussion of the Background

This is, for example, a coding through the Discrete Cosine Transformation of video digital data followed by a quantization of the transformed coefficients. This coding is used during the transmission and/or storage of images and particularly in production. It is thus used to reduce the volume of information to be stored, whether in a video recorder or in bulk memories.

In a studio, the images are read and recorded, that is to say, decoded and coded many times before the final result is obtained. The images are decoded and coded between 5 and 1.0 times on average, but it is not rare for the production of films to require up to a hundred or so generations.

Each image generation involves the decoding of the stored data. This decoding is generally followed by a coding of the new images obtained.

However, one of the problems with the digital coding of images is the effect of the cascading of several series of codings and decodings. Conventional techniques do not enable the same image quality to be preserved over various generations. Errors resulting from the losses of information due to this type of coding accumulate. The signal-to-noise ratio can fall by several decibels between two generations and can lead very rapidly to a poor quality image. Generally, no specific processing is applied in order to prevent this loss, which is very irritating, mainly in production.

SUMMARY OF THE INVENTION

The aim of the present invention is to overcome the aforementioned drawbacks.

To this end, the present invention has as its object a method for compressing data effecting quantization, which produces a histogram of the data to be compressed, of occurrence as a function of the values of the data, in order to determine, when the histogram is coherent, a quantization step based on the distance between the most frequent values of this histogram.

The present invention also has as its object a device for compressing data having a decorrelation circuit, a circuit for quantizing the decorrelated data and a control circuit acting on the quantization step, which also comprises a circuit for calculating a histogram of the decorrelated data and for calculating the quantization step on the basis of this histogram in order to force, in accordance with the coherence of the histogram, this quantization step.

By virtue of this method and device, the losses in signal-to-noise ratio become negligible when data are coded and the quality of the image is maintained over the different image generations.

BRIEF DESCRIPTION OF THE DRAWINGS

The characteristics and advantages of the present invention will emerge more clearly from the following description, given by way of example and with reference to the accompanying figures, where:

FIG. 1 depicts a known digital data coder of the prior art;

FIG. 2 depicts a known digital data decoder of the prior art;

DESCRIPTION OF THE PREFERRED EMBODIMENTS

Figure 3:
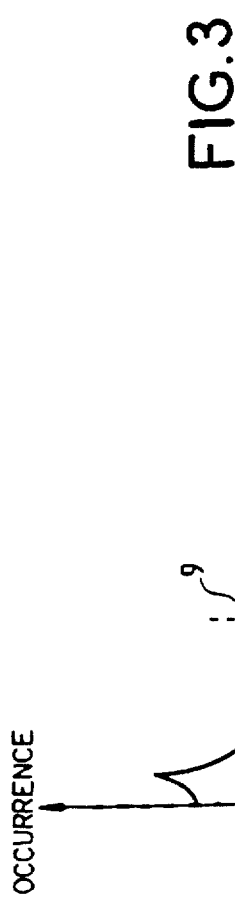
FIG. 3 depicts a curve representing the occurrence of transformed coefficients as a function of their value.

Referring now to the drawings, wherein like reference numerals designate identical or corresponding parts throughout the several views.

The general principle of a digital video data coder for the compression of data by means of correlation and quantization, known from the prior art, is depicted in FIG. 1.

A breakdown circuit 1 receives at its input the digital data coming from the source image. This circuit breaks down these data, that is to say decorrelates the information in order to eliminate redundancy therein. Thus, the breakdown circuit effects, for example, a sub-band breakdown or a Discrete Cosine Transformation.

The decorrelated signal is then transmitted to a quantizing circuit or a quantizer 2 whose role is to reduce the quantity of information to be transmitted. The quantized signals are then transmitted to an entropic coder 3 which associates codes of the greatest length with the least probable values. These are, for example, HUFFMANN, Arithmetic, B2 codes, etc.

A first coder output supplies the coded binary stream which constitutes the compressed information to be transmitted or recorded and which includes the information concerning the quantization step used and a second output is connected to a control circuit or controller 4. The role of this circuit is to control the flow at the output of the data coder in such a way that it corresponds to the available flow in the reference channel or flow. For this purpose, it is connected to the quantizer 2 and acts on the quantization step in accordance with the flow information collected.

For example, the breakdown circuit transforms the macrocells of an image composed of image cells of 8×8 pixels, through Discrete Cosine Transform, into cells of 8×8 coefficients, and then each coefficient, optionally weighted, is quantized before a Variable Length Coding (VLC) effects the entropic coding of these coefficients, following each other in a zigzag scanning of the matrix of coefficients.

The compressed information is thus stored and transmitted and to enable it to be used, the operations carried out for compression must be effected in reverse.

A typical decoder for such operations is depicted in FIG. 2.

It consists, in a known manner, of an entropic decoder 5, connected to an inverse quantization circuit or dequantizer 6, which is connected to an inverse breakdown circuit 7, which then supplies the decompressed useful information. Each of these circuits carries out the reverse operations of those of the data coder, which in our example is an inverse variable length coding, an inverse quantization, taking into account the received quantization step, and an inverse Discrete Cosine Transform.

Thus, between 2 image generations, the processings applied to the data are, in order:

breakdown, quantization, entropic coding with regard to coding, entropic decoding, inverse quantization, inverse breakdown for decoding.

Entropic coding is totally reversible at the decoder, that is no information is lost during the coding and decoding process.

It is therefore a reversible application which, consequently, does not involve the loss of information between two image generations.

However, breakdown and quantization are non-reversible coding techniques as they are sources of approximations and thus of errors. During the coding process, a small quantity of information is lost and cannot be retrieved at the decoder.

It is a matter, for example, of approximations related to the precision of calculation and with mathematical rounding during mathematical transformation on the sequences of data at the input or, quite simply, of quantization which calculates a quantization step which is generally a function of the statistical source data and which is in fact an approximation.

However, what is even more irritating is that these losses of information can accumulate during multiple generations. This is because the quantization steps change from one image generation to the other and these generations are necessary, for example, for editing sequences. The quantization steps are generally calculated on the basis of algorithms which take into account the statistical data of the sequence, such as the flow of images preceding the current image to be coded. Thus, the quantization step is often different from one compression to another depending on editing and changes during multiple generations. Depending on the quantization principle used, the quantized value is either a value rounded to the nearest integer corresponding to a maximum error of q/2, or a value rounded down whose maximum error is the quantization step q.

In all cases, each time the image is coded anew, if the quantizer has a step different to that used during the preceding coding, and for a given coefficient, the quantized value of the coefficient will be slightly different. Quantization thus gives rise to an accumulation of losses over multiple generations and this accumulation of errors being convergent in the first case (rounding).

The present method is based on the fact that the main effect of quantization is to pass from a uniform distribution of values to a distribution having peaks distributed in accordance with the step used. Moreover, if the step is not the same for each compression, the system will not be sensitive to residual noise and the results will be more or less identical for each generation, with no errors accumulating.

As shown in FIG. 3, two curves 8 and 9 are traced in an orthonormal reference frame, wherein the X axis represents coefficient values and the Y axis represents their frequency occurrence.

The curve 8, shown as a solid line, concerns an example of coefficients obtained by the transformation (breakdown) of a source image whose digital data has never been compressed. It therefore concerns a conventional distribution of the frequencies in a video image: the number of DCT coefficients is a decreasing function of their level. The coefficients corresponding to high frequencies are in the majority and are of a lower level and those corresponding to lower frequencies are fewer and of a higher level. The distribution of these digital and of a values is continuous.

The curve 9 shown as dotted lines, concerns the coefficients after a quantization and dequantization operation using a quantization step q. The distribution on the X axis is thus no longer uniform. After a dequantization operation, the only existing coefficient values are multiples of the quantization steps. By being placed downstream of the breakdown circuit, the values actually obtained and traced by the curve 9 in fact correspond to peaks spaced at the quantization step q. The roundings of the values during the mathematical calculation (DCT, inverse DCT) give rise to differences, represented by the broadening towards the base of the peak.

If, by any technique, it is possible to measure the find intervals between peaks, it is also possible to find out with which quantization step the values have been coded and thus to effect dequantization with the same step as that used for the first quantization. Naturally, it is assumed that the information concerning the quantization step, after having been used by the dequantizer, is lost, which is generally the case.

Figure 4:
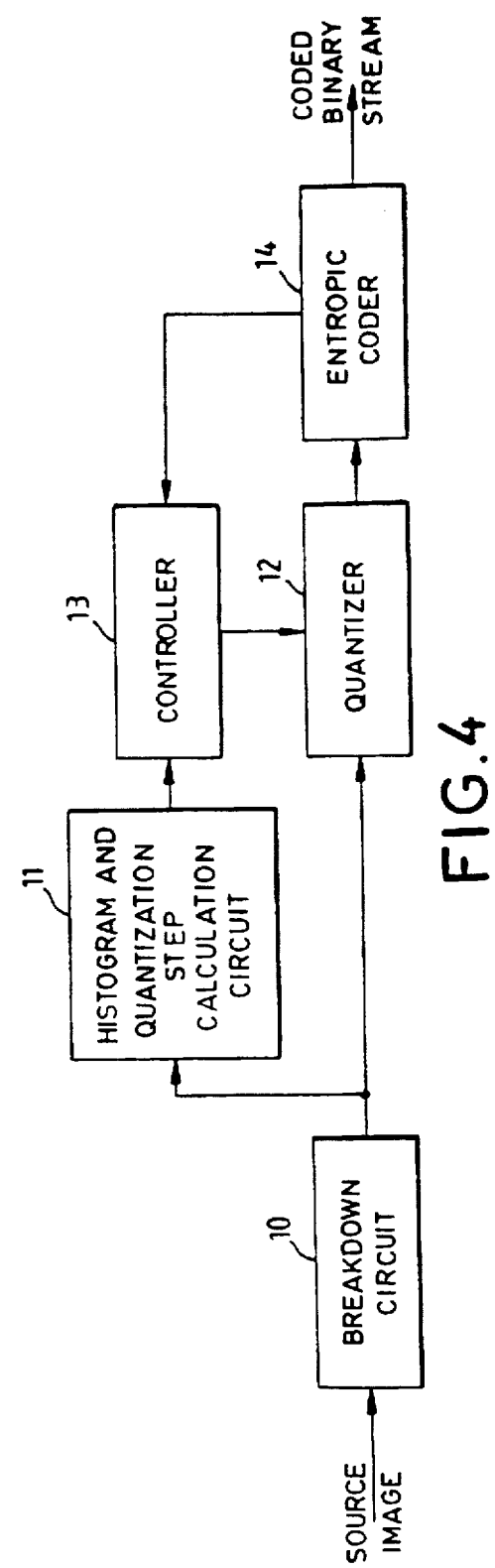
FIG. 4 depicts a decoder according to the invention.

It is a method based on this principle which the coding device of FIG. 4 uses.

The source image, which can be the original image or an image which has previously been coded and then decoded, is transmitted to a breakdown circuit 10 which effects a Discrete Cosine Transformation as indicated above in the description of the prior art. The coefficients obtained are then transmitted in parallel to a histogram and quantization step calculation circuit 11 and to a quantizer 12. The role of the first circuit, referred to hereinafter as a histogram calculation circuit, is to supply information on the coherence of the histogram and to calculate, on the basis of this histogram, a quantization step as explained hereinafter. The histogram calculation circuit thus supplies a quantization step value to the quantizer, via a controller circuit 13. The quantizer transmits the quantized coefficients to an entropic coder 14 which supplies the coded binary stream. This entropic coder 14 is also connected to the controller 13 in order to correct the quantization step transmitted by the histogram calculation circuit in cases where the flow of transmitted data is too great with respect to the stet value, giving rise to an assumption of incorrect calculation of this quantization step.

In this case, the role of the controller 13 is to adapt the transmission stream to the authorized channel flow or to the set value.

The principle of detecting the quantization step is based on the calculation of the distribution of the values at the output of the breakdown circuit 70, that is to say on the determination of a histogram. This is the role of the histogram calculation circuit 11.

The histogram is effected on a macrocell, on a line of macrocells known under the Anglo-Saxon term stripe, or even on the complete image depending on the algorithm used for quantization. It is effected on the entity for which this algorithm imposes the same quantization step and it can take into account the chrominance cells, in addition to the luminance cells, for better precision.

As shown in FIG. 1 or 4, the quantization takes place previously, it is necessary to be just in front of the quantizer, and then to detect the value peaks of the coefficients, that is to say the most frequent values, in order to measure the average difference between them. The latter gives the quantization step used previously, that is to say during the previous coding.

Figure 5:
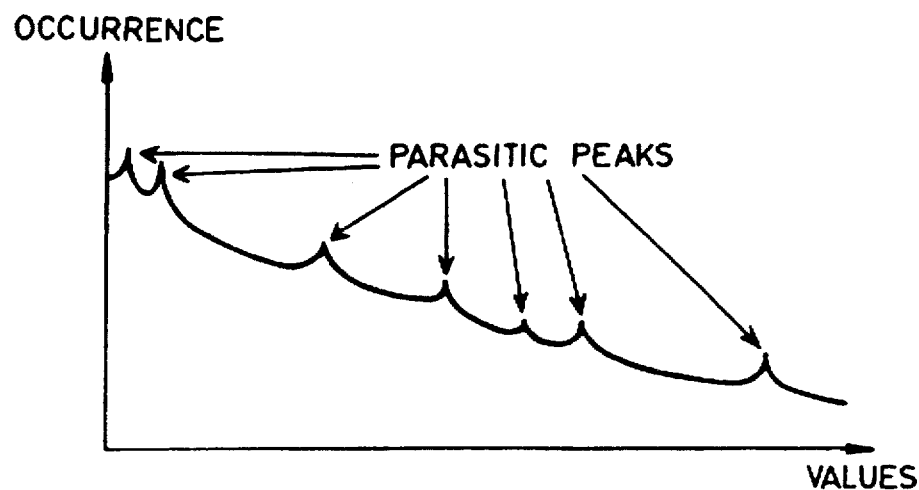
FIG. 5 depicts a curve representing the occurrence of transformed coefficients which have not previously been quantized, as a function of their value.
Figure 6:
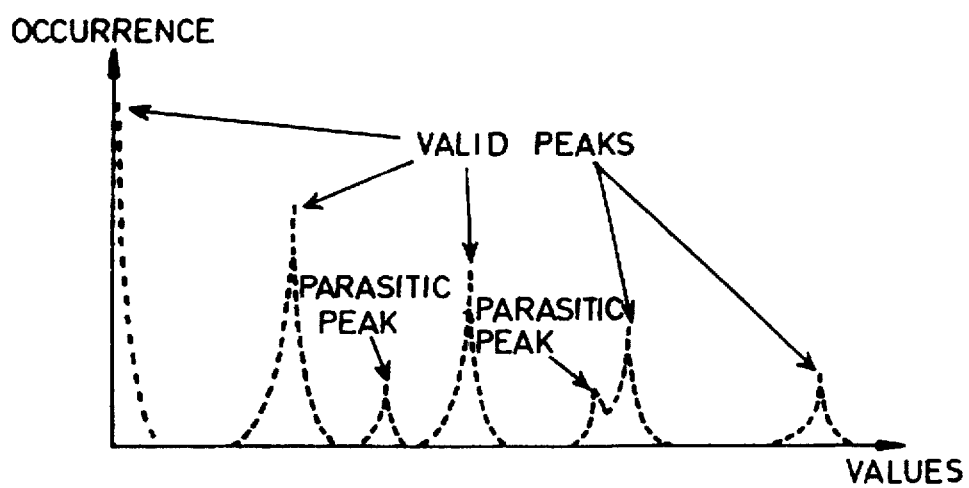
FIG. 6 depicts a curve representing the occurrence of previously quantized transformed coefficients, as a function of their value

FIG. 5 depicts such a histogram for a source image which has never been coded and FIG. 6 for a previously coded image. The axes define the same references as those of FIG. 3.

Although the image has never been coded, FIG. 5 shows the existence of peaks. Of a generally decreasing nature, as explained above, this curve has occurrence peaks corresponding to frequencies which are more present in the image than others, and thus intrinsic to the image broken down by frequency and arbitrary from one image to another. These are therefore parasitic peaks which come from the breakdown of the image into frequency coefficients (these peaks also exist on the curve 8 of FIG. 3 but have not been depicted for reasons of simplification).

FIG. 6 also shows the existence of parasitic peaks next to the "valid" peaks related to the quantization step. These parasitic peaks and the wider bases of the valid peaks are due to rounding errors made both during inverse breakdown and during subsequent breakdown for the generation of the coded binary stream.

In order to determine the quantization step it is therefore necessary to distinguish between the distributions of non-coded data (FIG. 5) and those of already coded data (FIG. 6). Then, as explained above, it is necessary to detect the peaks, and one difficulty consists of finding the means which can be used to distinguish the valid peaks from the invalid peaks.

Figure 7:
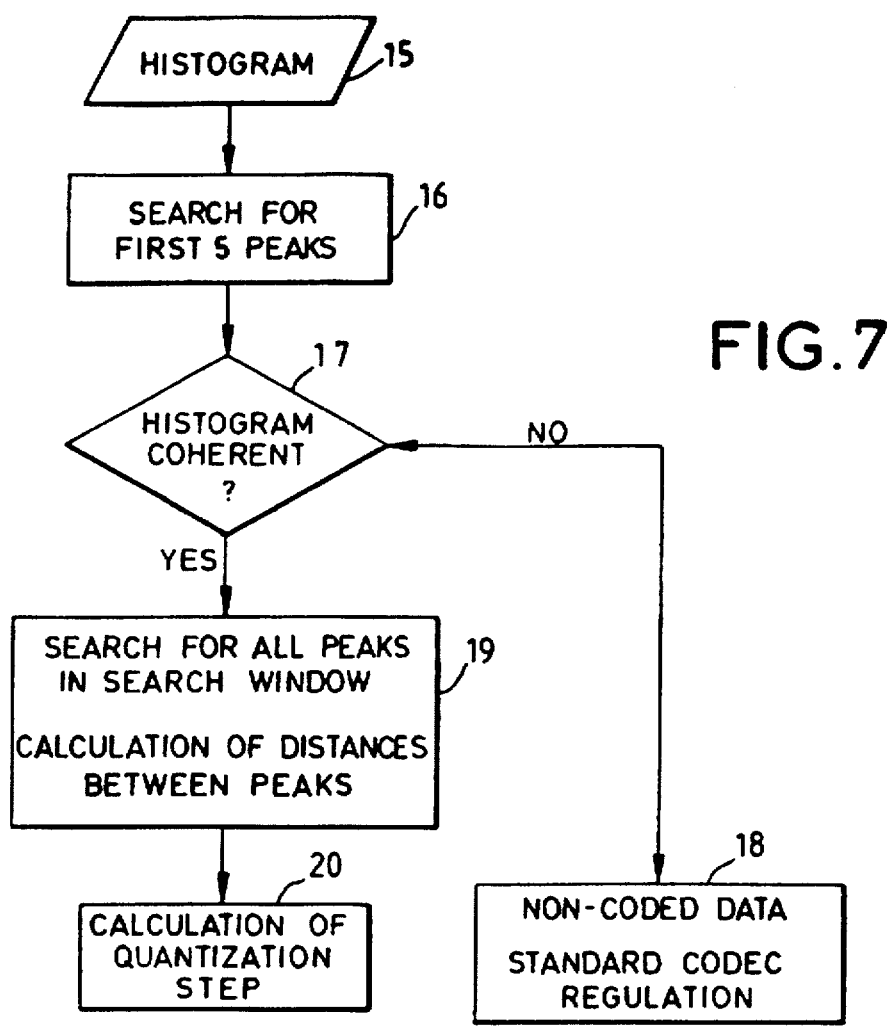
FIG. 7 depicts a flow diagram of the method of calculating the quantization step.

The flow chart of FIG. 7 details the different operations implemented by a histogram calculation circuit 11 which enables this problem to be solved.

The first step 15 consists of a determination proper of the histogram, that is to say of the frequency of the values of the data transmitted by the breakdown circuit 10. After obtaining such a distribution, the following step 16 searches for the first five largest peaks which are the most significant peaks. In order to detect the peaks, a solution consists of finding the local maximum values, that is to say the peaks at abscissa x whose value is greater than both the preceding value of the abscissa x−1 and the following value at the abscissa x+1. This makes it possible, in the case of a distribution of an already coded image, for the parasitic peaks not to be taken into account.

The step 17 determines whether the distances between these peaks are all equal, to within a unit, that is to say whether a certain regularity exists.

If this is the case, the histogram is said to be coherent and an average DELTA of these distances is calculated. The search range of ±1 is due to the rounding of the quantizer because the data to be quantized is in the form of integers, a suitable gain providing sufficient precision to ensure that this is the case. The quantization step q is generally a real number and the quantized values, which can be real, are thus rounded during dequantization in order to give integers. Consequently, the integers, after quantization and dequantization (and additionally inverse breakdown and breakdown) are distributed at every multiple of q, but are rounded to the nearest integer.

The first phase, steps 15, 16, and 17, thus consists of determining whether or not the distribution is of the continuous type, that is to say whether or not the data has already been coded. The phase which follows is different depending on the result obtained.

If it is a discrete distribution, or, in other words, if the histogram is coherent, step 19 is carried out. This step searches for valid peaks for the measurement of their abscissa and the precise calculation of the quantization step.

A method which takes into account only the valid peaks consists of searching, starting from the origin (where there is a maximum value) for the following maximum value M1 in a range of ±1 centered on the abscissa corresponding to the rounded value of DELTA. A search is then effected for a new maximum value in the same range whose center is offset by the rounded value of DELTA with respect to the abscissa M1 of this maximum value. The process continues in this way. On the basis of the measured abscissa, the differences and the mean of the differences is calculated in step 20 in order to find the quantization step, which may be real. The method for regulating the coding system then uses this step in order to quantize the data.

If this is not the case, the histogram is considered to be continuous and step 18 is effected, where the quantization step is deemed to be equal to 0. In this case, the data is assumed to not already have been coded and regulation is effected conventionally, that is to say by calculating the quantization step as a function of the complexity of the images and the available flow.

This technique assumes that the same information has been coded from one image to the next. A first problem is thus posed in the case of coding with an estimation of movement.

This estimation of movement is generally effected upstream of the breakdown circuit so that only the difference between a current cell and a cell predicted by this estimation of movement is coded. The movement vectors corresponding to this predicted cell are calculated for each compression and can vary slightly from one compression to another. The coded information, which is the prediction error, is then not the same.

In order to overcome this problem, two solutions can be adopted:

A good movement estimator can be used, based on the real movement and thus independent of the fact that the coding of an image can alter its content.

Operation in intra mode only, that is to say without using time prediction, and therefore estimation of movement.

A second problem concerns possible "non-linearities" during coding. This is because the technique described above assumes a process which is reversible between the coding and decoding. However, for example in the case of coding in accordance with the ETSI standard, of the Anglo-Saxon European Telecommunication Standards Institute, two types of processes are used: the first with the weighting matrices and the second with the non-linear law in the quantizer. It is then necessary to compensate for these "non-linearities".

The weighting matrices, also referred to as visibility matrices, consist of applying for each value a standardization coefficient depending on their position. In order to compensate for these matrices, it is necessary to apply the weighting coefficients to the values of the distribution before calculating distribution, to within the nearest rounding up error. The histogram is thus effected after breakdown and weighting, given that inverse weighting will take place during decoding, after dequantization.

Likewise, if a non-linear law is used in the quantizer, the inverse law must be applied in advance if possible. These non-linear laws have in general a linear part, for example according to the ETSI standard, which makes it possible to overcome this problem. Another solution consists of ignoring this problem, which will result in slightly wider peak bases, and as a general rule the non-linear laws modify the values only slightly. The principle of the method is then applied by calculating the distribution of the values supplying a histogram of the type in FIG. 5 or 6.

Figure 8:
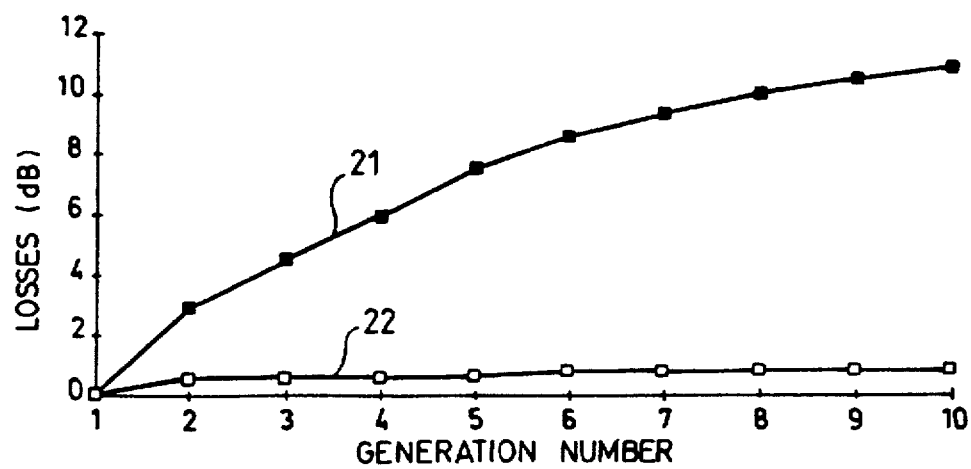
FIG. 8 depicts the losses due to multiple generation with or without the method according to the present invention.

FIG. 8 depicts two curves 21 and 22 in a reference frame having as an X axis the number of generations of a sequence of video images and, for the Y axis, the cumulative signal-to-noise losses expressed in decibels.

The curve 21 concerns image generation without the use of the method according to the invention and with a quantization by rounding up. The signal-to-noise ratio decreases rapidly, from around 3 dB for the first image generation to around 10 dB. This results in images whose visual quality deteriorates very rapidly and significantly. Quantization by truncating would give an even worse result, as the absence of convergence of the cumulative error does not enable this deterioration to be limited.

The curve 22 relates to the signal-to-noise losses during image generation using the method according to the invention. The losses remain lower than 1 dB and are of the order of 0.5 dB.

The invention described above concerns all the data coding systems, using quantization during this coding, and for which it is necessary to preserve the same information quality irrespective of the number of readings and writings. The invention finds applications particularly in the coding of video images or audio data.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A data compression method comprising the steps of:

producing a histogram of a data which is to be compressed before said data is quantized;

detecting local maximum values of the histogram;

determining whether the histogram is coherent; and calculating a quantization step based on differences measured between the local maximum values and an average DELTA of the differences.

2. A method according to claim 1, wherein the detecting step comprises detecting the local maximum values having a greatest amplitude.

3. A method according to claim 1, further comprising:

searching for a valid maximum value in a range of ±1 around a preceding valid maximum value incremented by DELTA, the quantization step being equal to an average of difference between all valid maximum values of the histogram.

4. A method according to claim 2, further comprising:

searching for a valid maximum value in a range of ±1 around a preceding valid maximum value incremented by DELTA, the quantization step being equal to an average of difference between all valid maximum values of the histogram.

5. A method according claim 1, wherein the producing step comprises the steps of:

compressing the data, said data being video data;

decorrelating the data before said video data is quantized; and producing said histogram on decorrelated data.

6. A method according to claim 5, further comprising the steps of:

linearizing the data with an inverse non-linear.

7. A data compression device comprising:

a decorrelation circuit that provides a decorrelated data;

a quantization circuit configured to quantize the decorrelated data;

a histogram and quantization calculation circuit configured to calculate a histogram of the decorrelated data and to calculate a quantization step on a basis of local maximum values and distances between peaks of the histogram in order to force the quantization step to be a function of a coherence of the histogram.

8. A means for data compression comprising:

means for producing a histogram of a data which is to be compressed before said data is quantized;

means for detecting local maximum values of the histogram;

means for determining whether the histogram is coherent; and means for calculating a quantization step based on differences measured between the local maximum values and an average DELTA of the differences.

* * * * *